Patented Jan. 21, 1941

2,229,549

UNITED STATES PATENT OFFICE 2,229,549

EMULSIONS

Clarence M. Carson, Cuyahoga Falls, Ohio, assignor to Wingfoot Corporation, Wilmington, Del., a corporation of Delaware No Drawing. Application July 2, 1937,
Serial No. 151,697

1 Claim. (Cl. 260—734)

This invention relates to emulsions which comprise condensation derivatives of rubber. More particularly the invention relates to such emulsions of the oil-in-water type in which the rubber derivative in a substantially unoxidized condition is dissolved in the oil and the water contans a caseinate. The invention includes the method of preparing the emulsions as well as the product.

In preparing the emulsion the cement of the rubber derivative (i. e. the rubber derivative dissolved in an organic solvent such as gasoline, benzol, petroleum, etc.) is mixed with the caseinate preferably in a high speed mixer such as a homogenizer or colloid mill. The casein may be brought into solution in water with any alkaline material. Softeners, plasticizers, fillers, coloring material and other additions may be suitably incorporated. The following example is illustrative:

Twenty-five grams of casein is brought into a creamy solution (free from lumps) in 250 cc. of warm water, containing 1 gram borax and 10 cc. dilute ammonium hydroxide. The casein may be brought into such solution by soaking anywhere from four to 24 hours with occasional stirring, or after soaking a short period, perhaps ten minutes at slightly elevated temperature it may be brought into such solution in a high speed mixer. Liquid softeners may now be added with stirring to effect complete dispersion. Next the solution or cement of the rubber derivative is added. A substantially unoxidized rubber condensation derivative such as that described in Sebrell U. S. Patent 2,052,423 may be used. I prefer to use the material of this type sold by the Goodyear Tire & Rubber Company under the trade name Pliolite. The solution of Pliolite in gasoline or benzol is slowly added to the caseinate using a high speed mixer, preferably a colloid mill. The mixing is continued until the desired emulsion is produced. Waxes, solid resins or viscous materials may be dissolved in the same solution as the Pliolite. After complete emulsification, dry fillers may be stirred into the emulsion. A representative formula is as follows:

| | | |
|---|---|---|
| Water | cc | 250 |
| Ammonium hydroxide | cc | 10 |
| Borax | gram | 1 |
| Casein | grams | 25 |
| Rubber derivative (30% sol'n in gasoline) | grams | 400 |
| Diamyl naphthalene | do | 40 |

By the addition of fillers, plasticizers, etc. emulsions for a variety of uses may be obtained. The emulsion prepared according to the above formula may be used for coating paper or as a paint for inside walls.

The emulsions of this invention will be found to be very stable. They can be spread, brushed or applied with a roller depending upon their consistency. In applying them to paper it will be found that the water is absorbed by the paper leaving the cement of the rubber derivative as a surface coating. To the thicker emulsions fillers, such as superfloss silica, MgO, Ca(OH)$_2$, etc., may be added to form a putty-like material with much the same characteristics as putty except that it has better adhesion to glass and wood and is more moisture resistant. Abrasives mixed with thick emulsions may be used in the manufacture of polishing wheels and for non-skid flooring, etc. Emulsions thinned to a brushing consistency may be applied as a water base paint and will be found to have good adhesion to wood, metal and glass.

Various polymeric materials some of which are resinous in character, for example, poly vinyl acetate, poly vinyl chlorides, poly vinylchloracetates, glyptal resins, etc., also rubber derivatives such as halogenated rubbers, rubber hydrohalides, etc., may be brought into emulsion form with the condensation derivative of rubber. All of these above mentioned materials are incompatible with the condensation derivative of rubber in a common solvent such as benzene. However, the condensation derivative of rubber may be dissolved in benzene or suitable petroleum hydrocarbon, then emulsified in the caseinate solution as heretofore described. Likewise the polymeric material of the type mentioned above or the rubber derivative may be added, as a solution, either in the same or a different solvent (for example if the condensation derivative is in petroleum, the polymeric substance may be dissolved in benzene, toluene, etc.) to a caseinate solution to form a separate emulsion. The two types of emulsions may then be mixed to form a stable, composite emulsion.

In preparing the rubber derivative various condensing agents may be used under non-oxidizing conditions, such as the halides of amphoteric metals, chlorostannic acid, aryl sulfonic acids, etc. Inorganic fillers such as pigments, etc. may be milled into the rubber derivative before it is brought into solution in the organic solvent and such inorganic materials may thus be incorporated in the oil phase of the emulsion. Other insoluble ingredients may also be similarly thus incorporated in the emulsion.

For brushing on glass, wall board, wood, plaster, etc. and materials such as the hard-pressed asbestos fibre product known as Transite it has been found that the addition of 2 to 10% of a water-soluble soap reduces the tendency to "drag" and the tendency of the emulsion to break on the brush. The following formula is representative of this type of emulsion:

| | Parts by weight |
|---|---|
| Casein | 10 |
| Water | 100 |
| Borax (preservative) | 1 |
| Triethanolamine | 2 |
| Oleic acid | 2 |
| 30% solution of rubber derivative in gasoline | 333 |
| Diamylnaphthalene | 25 |

The rubber derivative of the above formula is that prepared with chlorostannic acid according to Sebrell U. S. Patent 2,052,423. If a pigmented condensation derivative of rubber is preferred the 30% solution in the above may be replaced by milling zinc oxide and silica into the rubber derivative and bringing the resulting mixture into solution in Solvesso #4 (which is a kerosene marketed by the Standard Oil Company of New Jersey) according to the following formula:

| | Parts by weight |
|---|---|
| Rubber derivative | 60 |
| Zinc oxide | 140 |
| Superfloss silica | 67 |
| Solvesso #4 | 200 |

The addition of latex to the prepared emulsion by stirring in a slow speed mixer improves the adhesion of the coating and its resistance to scrubbing. The following formula is illustrative, the rubber derivative being the chlorostannic acid product of Sebrell 2,052,423:

| | Parts by weight |
|---|---|
| Casein | 10 |
| Water | 100 |
| Borax | 1 |
| Rubber derivative | 60 |
| Mineral fillers | 200 |
| Kerosene | 200 |
| Triethanolamine | 2 |
| Oleic acid | 2 |
| Latex (60% rubber) | 60 |

The "mineral fillers" of the above formula are pigments, etc. milled into rubber derivative and may be selected to give any desired color effect. Zinc oxide and silica in the proportions of the preceding formula will be found satisfactory.

Using casein as an agglutinate, soaps of the sulfated alcohol type, such as those marketed under the names Gardinol and Dreft, etc., give thin emulsions. Alpha protein is a good emulsifying agent for the rubber condensation derivative either alone or in admixture with other agents. Dextrine may also be used. The sodium salts of various sulfonates of organic compounds, such as those marketed as Darvan, Aquarex, Nekal and Aresklene, used in conjunction with agglutinants such as casein, dextrine or alpha protein may be used as emulsifiers.

The casein emulsions prepared as above described have been found superior to other emulsions of these rubber derivatives in various respects, although it is realized that eventually means may be found for improving such other emulsions. For example casein emulsions may be prepared which have a wide range of viscosity varying from a water-thin liquid to a thick paste. This range can be obtained with glue or with sodium soaps but such emulsions require heat to thin them to a workable consistency. Emulsions in various vegetable gums such as tragacanth are stable but are expensive in that a large amount of gum is required. Their adhesion to wood, glass, metal, etc., is not as good as with the casein emulsions. Emulsions in soaps have no adhesive properties and they also have a tendency to foam.

Many modifications in the casein emulsions are possible to adapt them to a wide variety of uses.

I claim:

An emulsion comprising a solution of a condensation derivative of rubber and a separate solution of a material resinous in character.

CLARENCE M. CARSON.